June 7, 1960 R. A. HETZER 2,939,336
TIMING DEVICE
Filed Dec. 7, 1956 8 Sheets-Sheet 1

INVENTOR
RUSSELL A. HETZER.
BY
Alfred R. Fuchs
ATTORNEY.

June 7, 1960  R. A. HETZER  2,939,336
TIMING DEVICE

Filed Dec. 7, 1956  8 Sheets-Sheet 2

INVENTOR
RUSSELL A. HETZER.
BY
Alfred R. Fuchs
ATTORNEY.

INVENTOR
RUSSELL A. HETZER.
BY Alfred R. Fuchs
ATTORNEY.

June 7, 1960 R. A. HETZER 2,939,336
TIMING DEVICE
Filed Dec. 7, 1956 8 Sheets-Sheet 5

INVENTOR
RUSSELL A. HETZER.
BY
Alfred R. Fuchs
ATTORNEY.

INVENTOR
RUSSELL A. HETZER.
BY
Alfred R. Fuchs
ATTORNEY.

INVENTOR
RUSSELL A. HETZER.
BY
ATTORNEY.

United States Patent Office 2,939,336
Patented June 7, 1960

2,939,336
TIMING DEVICE

Russell A. Hetzer, Fairway, Kans., assignor to Western Laundry Machinery Company, a corporation of Missouri Filed Dec. 7, 1956, Ser. No. 626,901

14 Claims. (Cl. 74—568)

My invention relates to timing devices, and more particularly to a timing device for controlling cycling processes and apparatus that is adapted to carry out a plurality of operations in relatively timed relation to each other successively.

It is a purpose of my invention to provide a timing device for controlling a multiplicity of time cycles in a desired sequence, said cycles being individually variable and selectable.

While my invention is adapted for timing various devices or various operations of a machine in sequence, for carrying out any desired operation so that these operations are automatically controlled with respect to the length of time that each of said operations takes place and the order in which the same take place, it is particularly adapted for use in connection with fabric treating apparatus, such as a washing machine as used for carrying out laundering and dry cleaning operations. In fabric treating apparatus it is desirable to automatically control the various cycles in the process and to select and vary the length of these cycles in accordance with the fabrics that are to be treated. However, my invention is capable of being utilized for controlling variable time cycles for any desired purpose.

It is a purpose of my invention to provide an improved cycling timer, which is associated with driving means in such a manner that the moving and setting of the various cycles automatically effects proper control of apparatus to function in the pre-selected sequence, and to provide in such an apparatus means that is readily accessible and readily adustable for controlling the length of the various cycles.

It is a particular purpose of my invention to provide a device of the above mentioned character, in which the setting of the various cycles can be easily changed by a simple dialing operation, but which is of such a character that if it is desired to use the same setting of the cycles in successive operations of the timing device, the timing device can be re-set to a starting position without disturbing the adjustment of the various cycles relative to each other.

More specifically my invention comprises a timing device that includes setting means comprising a plurality of rotatable plate-like members that are mounted for relative rotational adjustment and with each of which a cam or cams are connected to rotate therewith, the cams being engaged by followers the position of which is determined by a pair of relatively rotatable cams, and which followers have means for controlling an operation associated with each thereof that responds to the position of the follower, the entire set of cams and plate-like members being rotated in unison in a timed manner.

In certain types of apparatus, such as fabric treating apparatus, it is desirable to provide for the timing of two separate devices relative to each other and to control the length of the cycles so that two of such devices are in operation in a certain relation. Thus in a washing machine used in treating fabrics to clean the same, it is desirable to have the starting of the rotation of the washing machine and the entrance of washing fluid into the same controlled so that the beginning and the ending of the washing operation and the opening and closing of the valve that controls the flow of washing fluid into the washing machine timed relative to each other in some definite manner. In order to accomplish this and similar purposes in connection with apparatus carrying out processes controlled by my improved timing device, I provide a pair of cams on each of said plate-like members controlling a pair of devices, such as a motor and a valve, one pair of which cams is mounted so as to rotate with one of the plate-like or disk-like controlling members, and a pair of cams that is connected with another plat-like or disk-like controlling member that is rotatable relative to the first mentioned controlling member, said cams being of such a character and being arranged in such a manner that a follower will engage a corresponding cam of each pair, whereby one cam of one pair and the corresponding cam of the other pair by their relative adjustment will determine the position of one follower that controls one operation controlling device, and the other cam of each pair will be engaged by another follower that controls the operation of the other device that is to operate during the same or a related time interval to the first mentioned device.

More specifically my improved timing device comprises a plurality of telescopically related co-axial shafts of graduated length, that are so mounted that the end of each shaft that is telescoped within another projects beyond both ends thereof, with a set of cams mounted on each of said shafts at one end of said shafts, the ends that have the cams thereon being at the same end of the shaft assembly, and the opposite end of each shaft has adjusting means thereon for adjusting the cams carried by adjacent shafts relative to each other, said adjusting means comprising disk-like members that rotate with the shafts and have means thereon for manually adjusting the same, such as a finger piece, and which are provided with means for locking adjacent disk-like members in adjusted position relative to each other.

In carrying out my invention, means is also provided for manually rotating all of said disk-like members and the cams associated therewith as a unit and by power driven means, in a step by step manner with the steps taking place at uniformly spaced time intervals. The disk-like adjusting members that are provided are of graduated size so that a spring projected member on a smaller disk, which is adjacent a larger disk, is adapted to be engaged with a selected row of openings in a larger disk for holding the disks in their relative adjusted position.

One of the most important features of my invention is the cam structure and arrangement, whereby a pair of cams is utilized for determining the position of a follower, this being accomplished by providing cam disks which have high and low portions thereon that are relatively adjustable so that the low portion of one of the cams of a pair and the low portion of the other cam of said pair that control an operation can be adjusted so that varying amounts thereof will be in alignment with each other axially of the timing apparatus for controlling an operation by means of a follower that has a roller that, when in engagement with the low portion of a cam, causes the device that it controls to be operative, such as the maintaining of a motor in operation or the maintaining of a valve in open position, said cam means being of such a character that the low portion is less than half the cam surface of each thereof, whereby said cams can be set so that the operation controlled thereby will be skipped, which would be the case when none of the low portion of one of said cams will be aligned axially of the apparatus, with a low portion of the cam paired therewith. The cam means provided in my improved timer also preferably includes means for giving a signal when the series of operations controlled by the timer is completed, and cam means for halting the driving means for the timer when the series of operations has been completed.

Other objects and advantages of my invention will appear as the description of the drawings proceeds. I desire to have it understood, however, that I do not intend to limit myself to the particular details shown or described except as defined in the claims.

In the drawings:

Fig. 5 is a detail view of the spring projected means for locking the adjusting members in adjusted position and of the finger piece for rotating said adjusting members, said view being partly in section and partly in elevation.

Fig. 7 is a detail sectional view of an air valve controlled by one of said followers.

Figure 6:
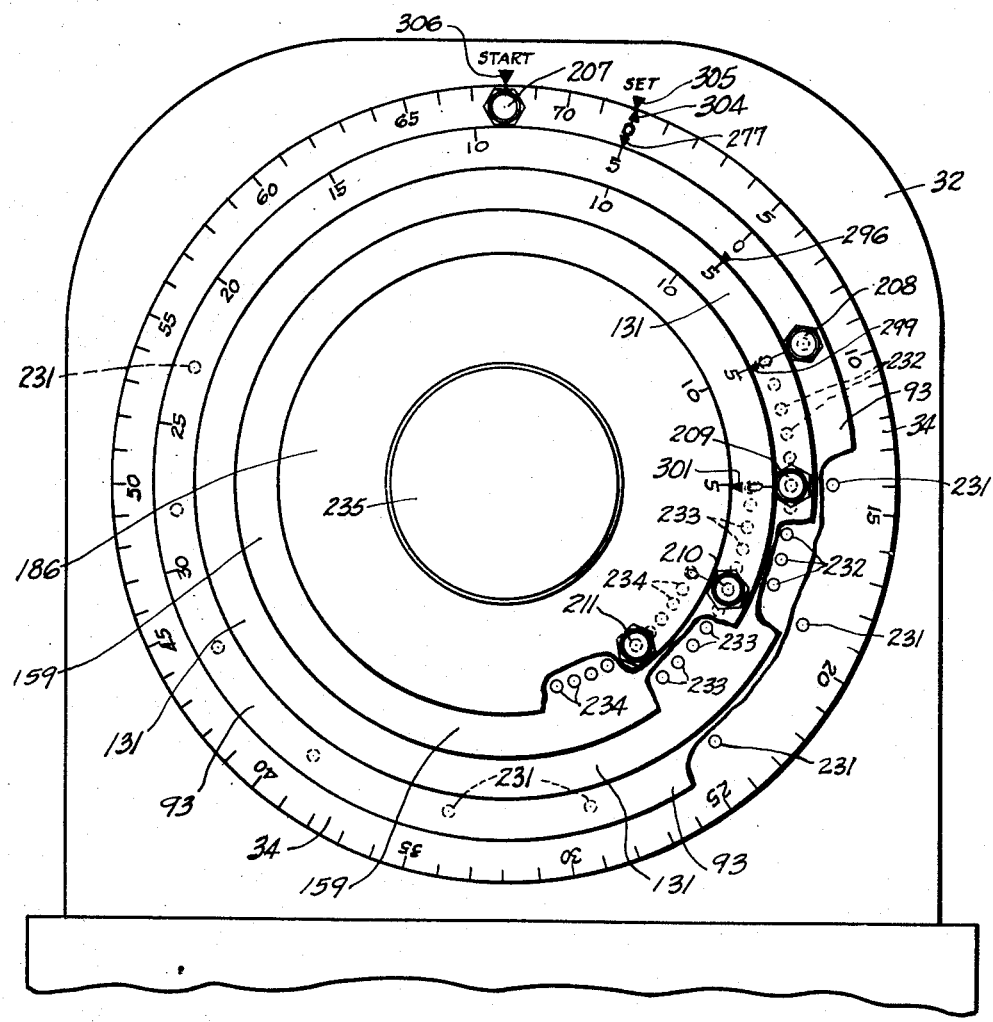
Fig. 6 is a face view of the dial portion of the timer, showing the adjusting disks in an adjusted position for carrying out a plurality of operations for selected time intervals, the disk-like members being partly broken away.
Figure 16:
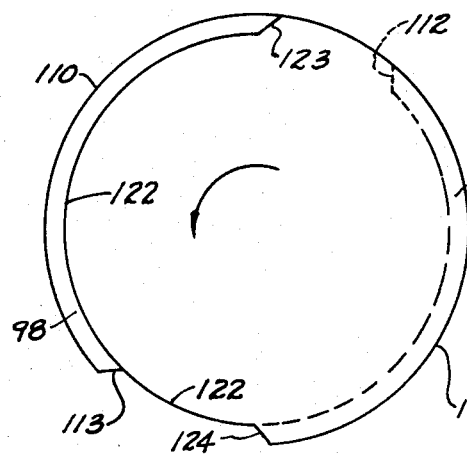
Fig. 16 is a diagrammatic view showing the relative position of the pair of larger in diameter cams in the adjusted position thereof determined by the adjustment of the second largest disk relative to the largest or monitor disk shown in Fig. 6.
Figure 21:
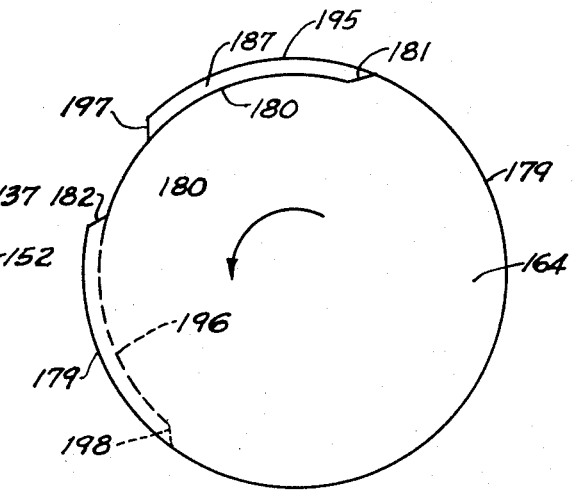
Figure 22:
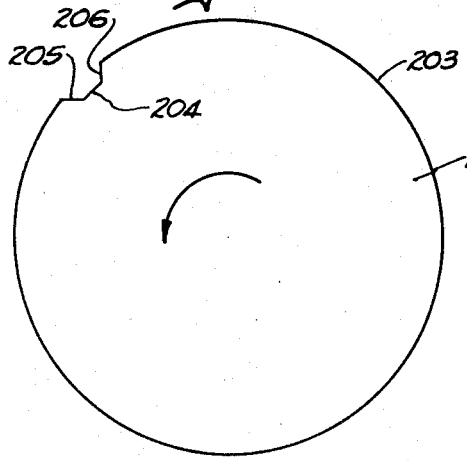
Figure 23:
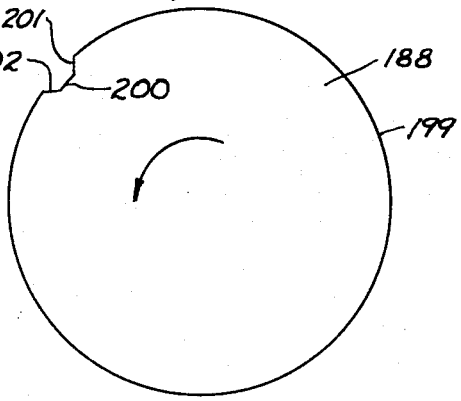

Fig. 21 is a view similar to Fig. 16 of the pair of cams in the adjusted position thereof determined by the position of the smallest disk relative to the next to the smallest disk shown in Fig. 6, and Figs. 22 and 23 are diagrammatic views of the cams for halting the operation of the timer and the signal operating cam in the position that said cams are in when the parts are in the adjusted position shown in Fig. 6.

Figure 1:
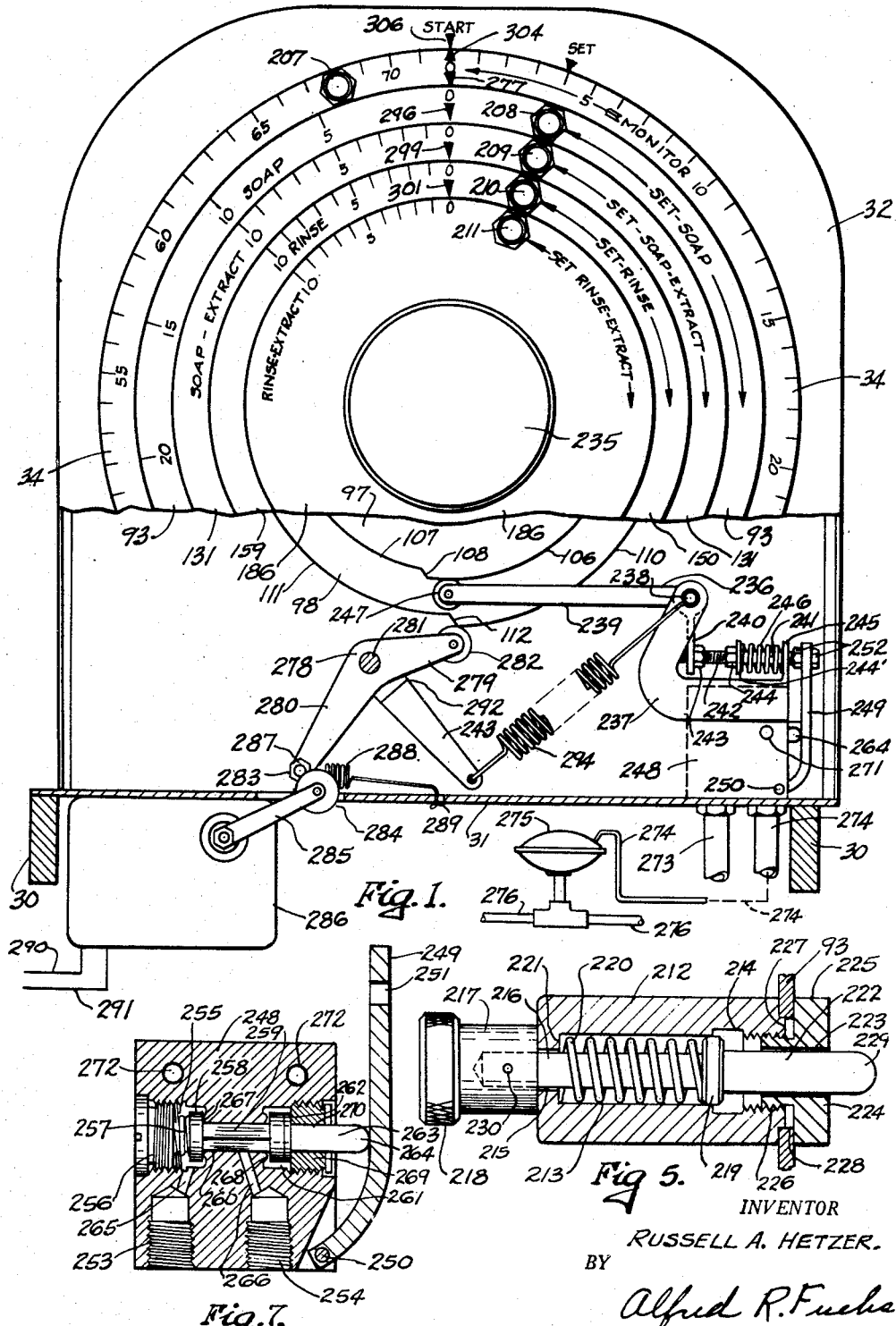
Fig. 1 is a front elevational view of my improved timing device partly broken away and partly diagrammatic.

Referring in detail to the drawings, in Fig. 1 is shown a pair of frame members 30, upon which is mounted a housing having a bottom wall 31 and a vertical end wall 32 through which projects a hollow tubular shaft 33, which has a disk 34 mounted thereon, said disk being mounted on a flange 35 provided on a thickened end portion of said shaft 33. The disk 34 is mounted adjacent the vertical wall 32, as will be obvious from Fig. 2. Also mounted on the shaft 33 is a ratchet wheel 36, being secured to the flange 37 of the tubular shaft 33. Connected with the tubular shaft 33 is a tubular extension 33' thereof, which also has a flange 37' thereon, that is connected with the ratchet wheel 36. Thus the shaft portion 33' rotates with the shaft 33, being fixedly secured thereto to rotate therewith.

Figure 4:
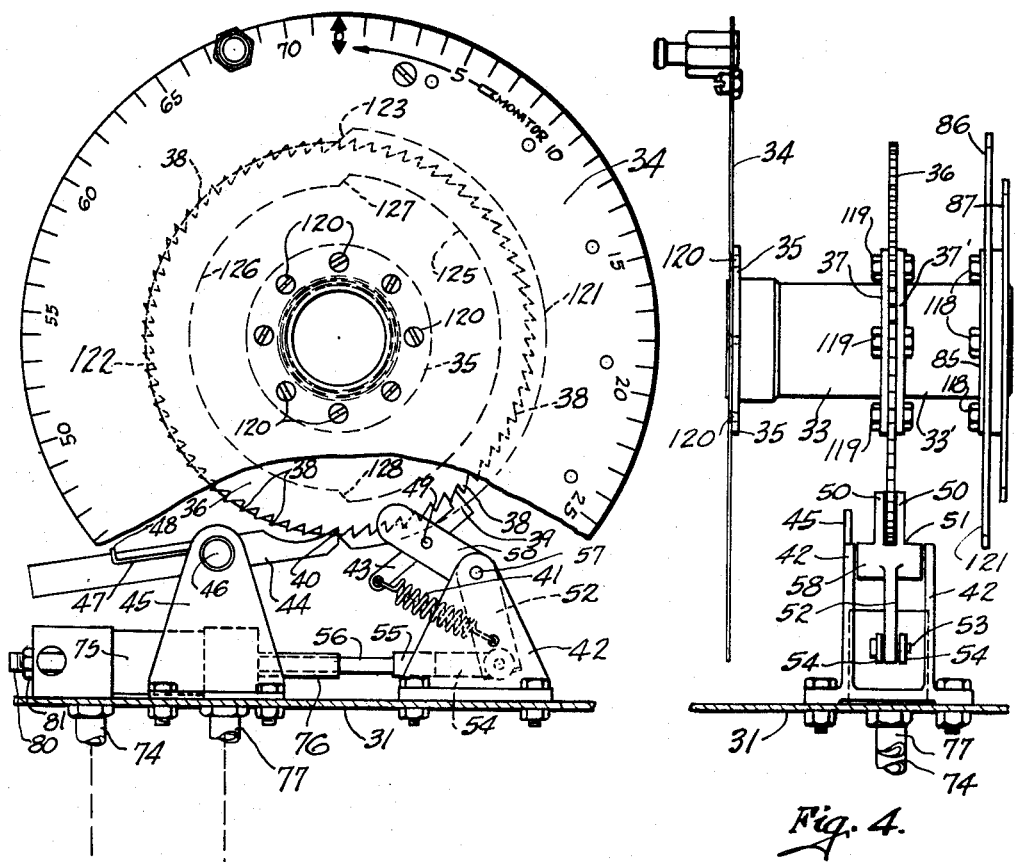
Fig. 4 is a view in side elevation and partly in longitudinal section of the driving means, the shaft on which it is mounted and associated parts.
Figure 3:
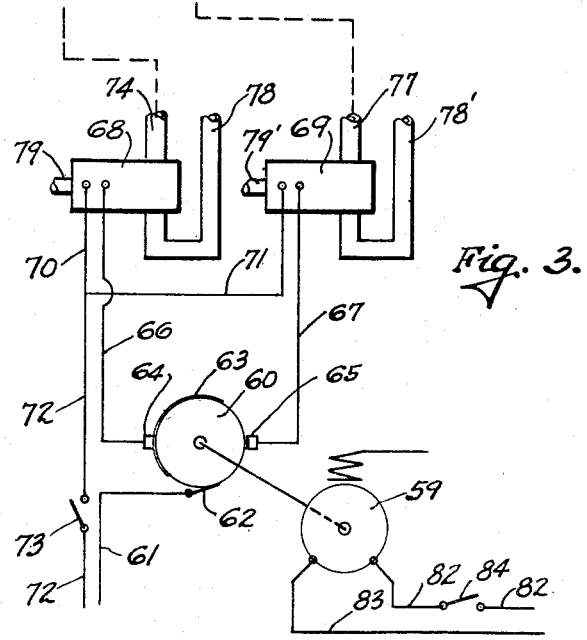
Fig. 3 is a view in elevation of the timer driving means, showing operating means for the drive diagrammatically, and showing one of the disks in elevation partly broken away.

Referring to Figs. 3 and 4 it will be noted that the ratchet wheel is provided with ratchet teeth 38 that are engaged with a pair of pawls 39 and 40. The pawl 39 is urged into engagement with the teeth 38 by means of a coil spring 41, which is mounted at one end on a bracket 42 mounted on the bottom wall 31 of the housing and which is secured at its other end to the opposite end of the lever 43 to that which is provided with the pawl 39. The pawl 40 is similarly provided on a lever 44, which is pivotally mounted on a bracket 45 that is mounted on the bottom wall 31 of the housing, said lever being urged about its pivot 46 in one direction by means of a spring 47 having a transverse hook portion 48 engaging said lever so as to urge the pawl 40 into engagement with the ratchet teeth 38. The pawl 40 acts as a holding pawl and the pawl 39 acts as a driving pawl, as will be explained below.

Pivotally connected with the mid-portion of the lever 43 by means of a pivot member 49 is a bifurcated arm 50 of a bell crank lever 51, the other arm 52 of which is connected by means of a pivot pin 53 with the bifurcated portion 54 of a fitting 55 mounted on a piston rod 56 to move therewith. The bell crank lever is mounted on a pivot member 57, which extends through the tubular bearing portion 58 provided on said bell crank lever and through suitable openings in the bracket member 42, which is provided with a pair of upstanding walls, as will be evident from Fig. 4.

It will be obvious that when the piston rod 56 is moved to the right as viewed in Fig. 3 the arm 50 of the bell crank lever 51 will move in a counter-clockwise direction, moving the pivot 49 of the lever 43 on which the pawl 39 is provided downwardly and to the left as viewed in Fig. 3, thus moving the pawl along the inclined face of the ratchet tooth 38, with which it is engaged, and until it passes the apex of said tooth and drops into engagement with the next tooth in a clockwise direction from that with which it was in engagement prior to such movement of said piston rod. Return movement of the piston rod causes the arm 50 of the bell crank lever to move in a clockwise direction and moves the ratchet wheel 36 proportionately in a counter-clockwise direction, as viewed in Fig. 3. The means for moving the piston rod 56 back and forth is of such a character that the ratchet wheel 36 has advanced the distance of one tooth in a counter-clockwise direction, as viewed in Fig. 3, for each reciprocation of the piston rod 56.

Said operating means for the piston rod 56 preferably comprises means for operating said ratchet drive at regular timed intervals so that the ratchet wheel will drive the shaft 33 and its extension 33' in an intermittent manner, but will rotate the shaft through an arc of uniform length for each movement of said shaft and will rotate said shaft through such increments of rotative movement at regular uniformly spaced intervals, whereby means connected with said shaft will have a total arcuate movement that is proportional to the time over which the driving means for the ratchet wheel is operating.

Preferably a motor 59 is provided as a controlling member to operate the piston rod 56 in this manner, said motor being a synchronous motor of the type ordinarily used in electric clocks. Said motor drives a suitable contactor 60, which has a conductor 61 from a suitable source of electrical energy connected with the rotating contact member 60 by means of a brush 62. A contact member 63 is also provided on the rotating contactor 60, which is adapted to engage with a stationary contact 64 and with a stationary contact 65 during the rotation of the contactor 66, the contact member 63 alternately engaging the contacts 64 and 65 to complete the circuit from the conductor 61 to a conductor 66 and to a conductor 67, respectively.

The conductor 66 leads to a solenoid valve 68 and the conductor 67 leads to a solenoid valve 69. Also leading to the solenoid valves 68 and 69 are the conductors 70 and 71, which are connected with a common lead 72 that may be provided with a switch 73 therein if desired, but which is connected with the same source of electrical energy as the conductor 61. It will accordingly be seen that the solenoid valves 68 and 69 will be alternately energized by the operating means comprising the motor 59 and the rotating contactor 60 shown diagrammatically in Fig. 3.

The solenoid valve 68 has a conduit 74 extending therefrom to one end of a cylinder 75, which has a piston (not shown) therein connected with the piston rod 56 so as to move therewith, the piston rod operating through a guide tube 76 mounted on one end of the cylinder 75. The solenoid valve 69 similarly has a conduit 77 extending to the other end of the cylinder 75. Also connected with the solenoid valve 68 is a compressed air line 78 and an exhaust pipe 79, which leads to the atmosphere. The solenoid valve 69 is provided with a compressed air line 78' extending from the same source of compressed air as the compressed air line 78 and is provided with an exhaust pipe 79' leading to the atmosphere. The solenoid valves 68 and 69 are of a well known character, in which resilient means is provided for moving the valve in one direction and in which a solenoid is provided for moving the valve in the opposite direction. In corresponding positions of each of said valves 68 and 69 the compressed air supply line 78 is connected with the conduit 74 and the compressed air supply line 78' is connected with the conduit 77, while in the alternate corresponding position of said valves the conduit 74 is connected with the exhaust pipe 79 and the conduit 77 is connected with the exhaust pipe 79'.

Due to the alternate energization of the solenoid valves 68 and 69, air under pressure will be supplied at regular timed intervals through the conduits 74 and 77 to the alternate ends of the cylinder 75, thus reciprocating the piston therein, and correspondingly the piston rod 56, in the opposite directions at regularly timed intervals. Suitable means is provided, extending from the piston through the opposite end of the cylinder 75 to that having the guide 76 thereon for adjusting the stroke of the piston so that each reciprocation thereof will move the ratchet wheel counter-clockwise, as viewed in Fig. 3, exactly the distance of a ratchet tooth 38, said means comprising a screw-threaded stop member 80 and a suitable nut 81 mounted thereon adapted to engage the end of the cylinder to limit the stroke of the piston 56 in a direction from right to left, as viewed in Fig. 3. The conductors 82 and 83 lead to the motor 59 and a switch 84 is interposed in the conductor 82 to control the operation of the motor 59. Said switch is of such a character that upon being closed it will be held in closed position until the holding means for the switch is released. A means for accomplishing this may comprise a holding relay, which is de-energized by suitable means under the control of the timer when the operations controlled by the timer are completed.

The extension 33' of the shaft 33 is provided with a flange 85 to which a cam disk 86 is secured. Also secured to the flange 85 is a cam disk 87, a spacer 88 being provided between the cam disks 86 and 87. The cam disks 86 and 87 are fixed so as to rotate with the hollow shaft 33 by means of the connection provided between the extension 33' of said shaft, the flanges 37 and 37' and the ratchet disk 36, said cam disks 86 and 87 having a fixed relationship to each other as they rotate with the shaft 33. The shaft 33 and its extension 33' are provided with inwardly extending annular ribs 89, which serve as bearing portions for a tubular shaft 90 mounted within the same.

Figures 8, 9:
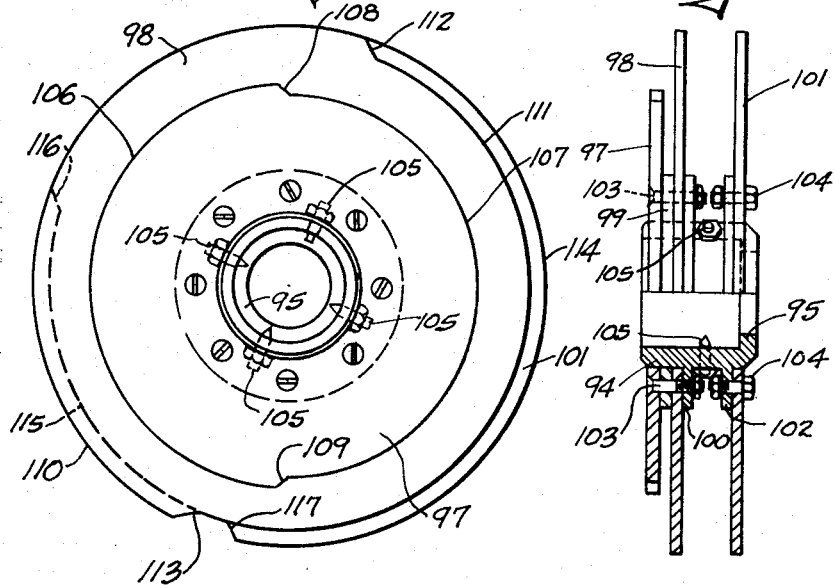
Fig. 8 is a face view of a set of cams mounted on a hub, detached from the shaft with which it is associated, the particular set of cams being for mounting on the shaft that is telescoped within the outermost shaft of the timing device.
Fig. 9 is a view partly in axial section and partly in edge elevation of the cams and hub shown in Fig. 8.

The tubular shaft 90 has a flanged collar 91 provided thereon, the outwardly directed flange 92 on said collar having a disk 93 secured thereto so as to rotate therewith, and said hollow shaft also has fixed thereon a collar 94 at the opposite end thereof to that which has the disk 93 mounted thereon. It will be noted that the shaft 90 extends outwardly beyond the end of the extension 33' of the shaft 33 and that the collar 94 is mounted thereon so that a peripheral edge portion thereof engages with the peripheral end edge of the shaft extension 33'. Said collar has an inturned annular flange 95 thereon which serves as a bearing for a tubular shaft 96 mounted within the shaft 95. Mounted on the collar 94 in fixed position thereon are the cam disks 97 and 98, between which a spacer 99 is provided, said cam disks being secured in fixed position on a flange 100 on said collar 94. Said collar 94 is also provided with a cam disk 101, which is secured on said collar in fixed position by means of securing means engaging the flange 102 on the collar 94. The details of construction of said collar 94 and the cam disks mounted thereon are shown in Figs. 8 and 9 of the drawings. Fastening elements 103 secure the cam disks 97 and 98 and the spacer member 99 to the flange 100, and securing elements 104 secure the cam disk 101 to the flange 102. Suitable securing elements 105 are provided for securing the collar 94 to the shaft. The collar 94 with its flanges constitutes a hub for the cam assembly comprising the cams 97, 98 and 101.

Upon reference to Fig. 8 it will be noted that the cam 97 has a high portion 106 and a low portion 107 connected by means of inclined portions 108 and 109. The cam 98 has a high portion 110 and a low portion 111 that are connected by means of the inclined portions 112 and 113, and the cam disk 101 has a high portion 114 and a low portion 115 connected by means of the inclined portions 116 and 117. The high and low portions of the cam disks 97, 98 and 101 are fixed relative to each other, as will be obvious.

The cam disks 86 and 87 are mounted in a similar manner on the flange 85 to that in which the cam disks 97 and 98 are mounted on the collar 94, the fastening elements 118 being provided for this purpose. Similar fastening elements 119 are provided for securing together the shaft 33, shaft extension 33' and the ratchet disk 36, as shown in Fig. 4. The disk-like member 34 provided on the hollow shaft 33 is secured to the flange 35 by means of screw-threaded headed fastening elements 120, as shown in Figs. 3 and 4. The cam disk 86 is shown in Fig. 16 as having a high portion 121 and a low portion 122 connected by the inclined portions 123 and 124 and the cam disk 87 is shown in Fig. 3 as having a high portion 125 and a low portion 126 connected by means of the inclined portions 127 and 128, the relative position of said high and low portions of the cams 86 and 87 being fixed due to the manner in which they are mounted on the shaft extension 33'. It will be noted that the tubular shaft 90 extends outwardly beyond the end of the shaft 33 that has the disk 34 thereon and that the shaft 90 is of greater length than the combined length of the shaft 33 and its extension 33'.

The shaft 96 has a flanged collar 129 thereon, which has the right angular flange 130 provided thereon, upon which a disk-like member 131 is mounted, the mounting of the disk-like member 131 on the flange 130 being similar to that of the mounting of the disk-like member 34 on the flange 35. Also mounted on the shaft 96 at the opposite end thereof from the disk-like member 131 is a collar 132. The end edge of said collar 132 engages with the end of the collar 94 having the inturned flange 95 thereon and said collar 132 has a similar inturned flange 133 thereon, the flange 133 acting as a bearing for the innermost tubular shaft 134. The shaft 96 extends endwise beyond the shaft 90 at both ends thereof, as will be obvious from Fig. 2.

Figure 10:
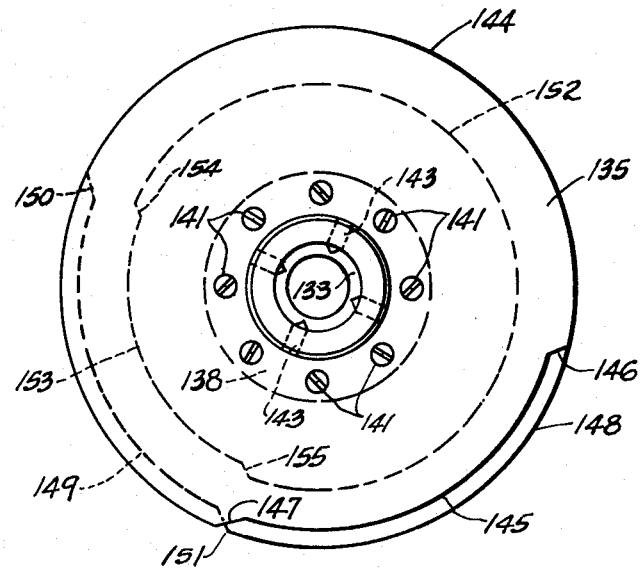
Fig. 10 is a view similar to Fig. 8 of the set of cams for mounting on the shaft that is telescoped within the shaft for which the cams shown in Fig. 8 are provided.
Figure 11:
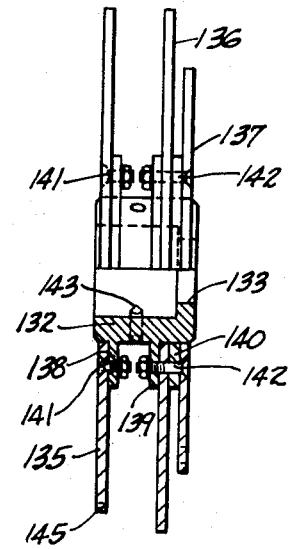
Fig. 11 is a view similar to Fig. 9 of the set of cams and hub shown in Fig. 10.

Mounted on the collar 132 (see Figs. 2, 10 and 11) are the cam disks 135, 136 and 137, which are mounted on the flanges 138 and 139 provided on said collar, a spacing member 140 being provided between the cam disks 136 and 137 mounted on the flange 139. The cam disks are secured to the flanges by means of the fastening elements 141 and 142 and the collar 132 is secured to the shaft in fixed position by means of fastening elements 143, which are similar to the fastening elements 105 previously described in connection with the collar 94.

The cam disk 135 has a high portion 144 and a low portion 145 connected by means of the inclined portions 146 and 147. The cam disk 136 has a high portion 148 and a low portion 149 connected by means of the inclined portions 150 and 151. The cam disk 137 has a high portion 152 and a low portion 153 connected by means of the inclined portions 154 and 155.

Mounted on the hollow tubular shaft 134, which extends endwise beyond both ends of the shaft 96, at one end thereof is a collar 156, which has an inwardly directed annular flange 157 thereon that acts as a bearing for the shaft 158. The other end of the shaft 134 has a disk-like member 159 mounted thereon, a flanged collar 160 being provided on the shaft 134 for mounting said disk-like member thereon by means of the outwardly directed flange 161, the disk-like member 159 being secured to the flange 161 in substantially the same manner as the disk-like member 34 is secured to the flange 35 shown in Fig. 4.

Figure 12:
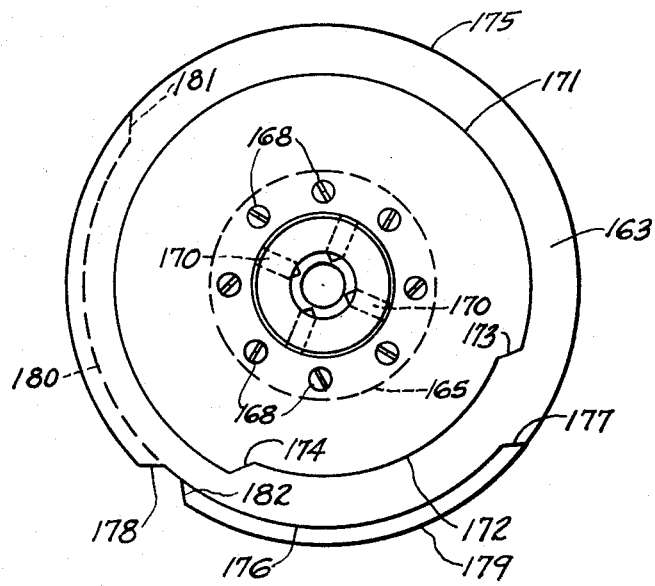
Fig. 12 is a view similar to Fig. 8 of the set of cams that is provided for mounting on the shaft that is telescoped within the shaft that carries the set of cams shown in Fig. 10.
Figure 13:
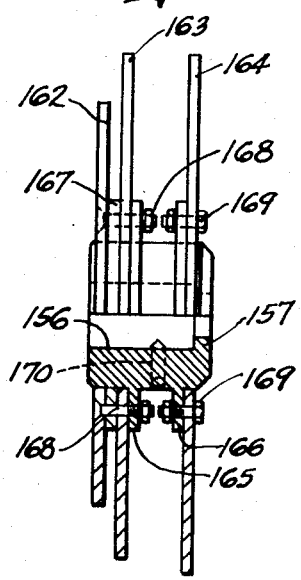
Fig. 13 is a view similar to Fig. 9 of the set of cams and the mounting therefor shown in Fig. 12.

Mounted on the hub 156 are the cam disks 162, 163 and 164, the same being mounted on flanges 165 and 166 provided on the collar 156. The details of construction of said collar and the cam disks mounted thereon are shown in Figs. 12 and 13. A spacing member 167 is provided between the cam disks 162 and 163 and said cam disks 162, 163, and spacing member 167 are secured together and to said flange 165 by means of fastening elements 168, the cam disk 164 being secured to the flange 166 by fastening elements 169. Fastening elements 170 are provided for securing the collar 156 to the shaft 134. The cam 162 has a high portion 171 and a low portion 172, which are connected by means of inclined portions 173 and 174. The cam disk 163 has a high portion 175 and a low portion 176, which are connected by means of the inclined portions 177 and 178, and the cam disk 164 has a high portion 179 and a low portion 180 that are connected together by the inclined portions 181 and 182.

Figures 14, 15:
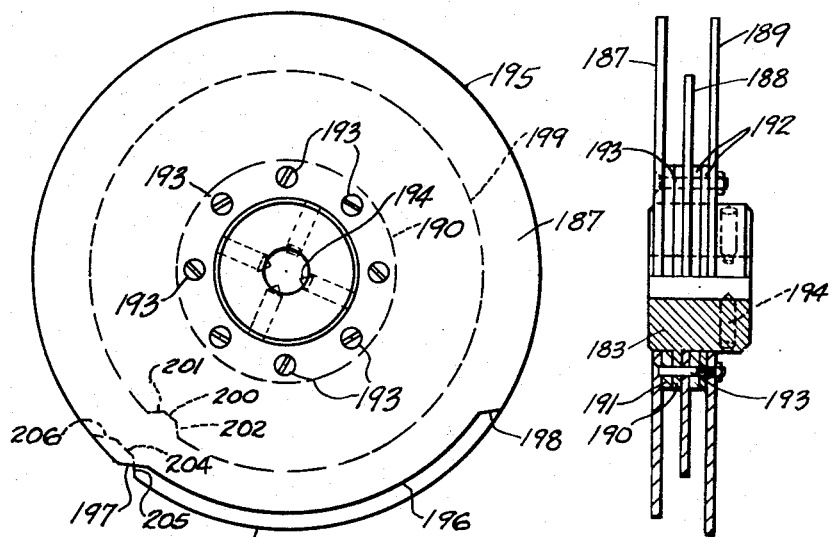
Fig. 14 is a view similar to Fig. 8 of the set of cams mounted on the innermost shaft.
Fig. 15 is a view similar to Fig. 9 of the set of cams and mounting therefor shown in Fig. 14.

The shaft 158 extends beyond the ends of the shaft 133 and is mounted in a suitable bearing in the frame at the end thereof that extends beyond the collar 183 mounted thereon, the mounting in the frame not being shown in the drawings. Also mounted on the shaft 158 is a flanged collar 184, which has an outwardly directed annular flange 185 thereon to which the disk-like member 186 is fastened in a similar manner to which the disk-like member 134 is secured to the flange 135. The collar 183 has the cam disks 187, 188 and 189 mounted thereon, being provided with a single flange 190 for securing said cams in position. Mounted between the flange 190 and the cam disk 187 is a spacer member 191 and mounted between the cam disk 188 and the cam disk 189 are a pair of spacer members 192, all said cams and spacer members being secured together and to the flange 190 by means of fastening elements 193. Said collar 183 and the cam disks mounted thereon are shown more in detail in Figs. 14 and 15. The collar 183 is secured to the shaft 158 by suitable fastening elements 194.

The cam disk 187 has a high portion 195 and a low portion 196 connected by means of inclined portions 197 and 198. The cam disk 188 has a high portion 199 and a low portion 200 connected by means of the inclined portions 201 and 202, and the cam disk 189 has a high portion 203 and a low portion 204 connected by means of the inclined portions 205 and 206.

Mounted in fixed position on the disk 34 is a finger piece or handle 207 for rotating said disk about its axis. Finger pieces 208, 209, 210 and 211 are similarly mounted on the disks 93, 131, 159 and 186, respectively. However, the finger pieces 208, 209, 210 and 211 differ from the finger piece 207, in that these not only serve as means for rotating the disks about their axes, but also are provided with means for holding the axially adjacent disks in an adjusted position relative to each other against relative rotation. In order to serve this purpose, the finger pieces 208, 209, 210 and 211 are made as shown in Fig. 5, comprising a hollow body portion 212, which has a longitudinal bore 213 therein having an internally threaded portion 214 at one end thereof and opening into a reduced bore 215 at the other end thereof. A stem portion 216 extends slidably through the opening 215 and has a head portion 217 mounted thereon, which is provided with a knurled enlarged finger grip portion 218.

An annular enlargement 219 is provided on the stem 216 and a compression coil spring 220 is mounted between the enlargement 219 and the end wall 221 of the body portion 212. A plunger 222 is provided on the stem 216 extending from the enlargement 219 and said plunger extends slidably through an opening 223 in a guide member 224, which has a head portion 225 thereon and an externally threaded portion 226 that engages the internally threaded bore 214. A boss 227 is provided on the end face of the body portion 212 for guiding the body portion of the finger piece into the opening 228 provided in the disk-like member upon which the finger piece is mounted. In Fig. 5 the opening is shown as being in the disk member 93. However, all of the disk-like members are provided with similar openings receiving the finger piece, and the finger pieces are all clamped to the disk-like members on which they are mounted by being clamped between the head portion of the guide member and the end face of the body portion 212 of the finger piece, in the manner shown in Fig. 5. The plunger is provided with a rounded end portion 229 to aid in directing the same into an opening in an adjacent disk with which it engages in a manner to be described below. The stem 216 and the head portion 217 are secured together by means of a cross pin 230.

Each of the disk-like members is provided with openings for receiving the plunger of a disk-like member that overlies the same. Thus the disk-like member 34 has openings 231 therein that are arranged around the same in an arcuate series at uniformly spaced intervals and in inwardly spaced relation from the periphery of the disk-like member, that are adapted to be selectively engaged by means of the plunger 222 on the finger piece 208 on the disk-like member 93, the circular series of said openings, in the case of the disk-like member 34, extending entirely around the same. A similar, but more closely spaced arcuate series of openings 232, are provided in spaced relation to the periphery of the disk-like member 93 so that the plunger on the finger piece 209 mounted on the disk-like member 159 adjacent its periphery will be adapted to engage in a selected one of the openings 232. The disk-like member 131 is provided with a similar arcuate series of openings 233 that are mounted in such spaced relation to the periphery of the disk-like member 131 that the plunger on the finger piece 210 is adapted to engage with a selected one of said openings 233. Similarly the disk-like member 159 is provided with an arcuate series of openings 234 that are so located relative to the periphery of the disk-like member 159 that the plunger on the finger piece 211 is adapted to be engaged with a selected one of said openings. It will be noted that the openings 231 are rather widely spaced, but that the openings 232, 233, and 234 are equal arcuate distances apart, although the actual spacing of the openings in the arcuate series in each case increases as the diameter of the disk increases. The disk-like member 186 is provided with a knob 235 thereon for rotating the same and for manually rotating the entire assembly of disks 34, 93, 131, 159 and 186 as a unit.

The disk-like members 34, 93, 131, 159 and 186 are adapted to be rotated independently of each other along with the shafts on which the same are mounted and the cam members that are carried by the respective shafts connected with said disk-like members. The disk-like members 34, 93, 131, 159 and 186 comprise adjusting members or adjusting dials. It will be obvious that each of the adjusting members or dials with its shaft and cams can be adjusted or rotated about its axis independently of all the others. This is accomplished by pulling outwardly, or to the left as viewed in Fig. 5, on the head 217 by means of the finger grip 218 thereon to compress the spring 220 and withdraw the plunger 222 from the opening in which it may be seated in the disk adjacent the one on which the finger piece is mounted that carries said plunger. Also it will be noted that all of the adjusting members, shafts and cams can be rotated together as a unit by means of the knob 235 when the plungers on each of the finger pieces 208, 209, 210 and 211 are in a selected opening in the disks 34, 93, 131 and 159. Furthermore all said cams, adjusting members and shafts will be rotated as a unit by the ratchet drive mechanism when the pins on said finger pieces are in selected openings in said above referred to disk-like members.

Referring to Fig. 1, it will be noted that a bell crank lever 236 is provided, which is mounted on a bracket 237 so as to pivot about the pivot pin 238, said bell crank lever having a long arm 239 and a short arm 240. The short arm of the bell crank lever is connected with a reciprocable rod 241, being provided with an elongated slot connection (not shown) with said rod 241, said rod being threaded at 242 and having the nut 243 threaded thereon which acts as an adjustable stop member with which the arm 240 of the bell crank lever engages to move the rod-like member 241 endwise of itself. Also mounted on the threaded portion 222 of the rod-like member is a nut 244 engaging a washer 244' between which and a guide flange 245 on the bracket 237 is mounted a compression coil spring 246. A roller 247 is mounted on the end of the long arm 239 of the bell crank lever 236, and it will be obvious that the coil spring 246 will urge the bell crank lever in a direction such as to maintain the roller 247 in contact with the cam, or cams, which the same engages.

The bracket 237 is mounted on a valve housing 248, which has a pivoted valve operating lever 249 mounted thereon, said lever being pivoted to the valve housing at 250. Said lever 249 is provided with an opening 251 therein, through which the rod-like member 241 extends, said rod-like member having a threaded portion thereon at the end thereof that extends through said opening 251, which is clamped in fixed position to the lever by means of a pair of nuts 252 engaging the opposite sides of said lever 249. It will be obvious upon reference to Fig. 1 that when the roller 247 moves from the position thereof shown in Fig. 2 onto a low portion, or low portions, of cams with which the roller 247 engages, the arm 240 of the bell crank lever will move to the left as viewed in Fig. 1, or clockwise about the pivot 238, and will cause the valve operating lever 249 to swing inwardly toward the housing 248 about the pivot 250, operating the valve in a manner to be described below.

The valve housing 248 is shown more in detail in Fig. 7. An internally screw-threaded inlet passage 253 and an internally screw-threaded outlet passage 254 are provided in said valve housing. Said valve housing also has a chamber 255 provided therein, that is closed by means of a screw-threaded plug 256, a coil spring 257 being mounted between the inner end of said plug 256 and the head 258 on the movable assembly, which has a rectangular shank portion 259 extending through a cylindrical passage 260 extending from the chamber 255 to the chamber 261. Said movable valve assembly also has a head 262 thereon and a plunger 263 extending lengthwise from said head 262 and having a rounded end 264 engaged by the lever 249. An air passage 265 extends from the inlet 253 to the chamber 255 and an air passage 266 extends from the cylindrical passage 260 to the outlet connection 254. The chamber 255 is provided with a valve seat 267, with which the head 258 is adapted to engage, said head 258 being provided with a flat face to engage said seat and acting as a valve member to engage said seat. Similarly the chamber 261 is provided with a seat 268, with which the flat face of the enlargement 262 engages, said head 262 thus serving as a valve that engages said seat 268. A screw-threaded plug 269, which has a guide passage 270 therein closely receiving the plunger 263, is provided for closing the chamber 261.

It will be noted that when the plunger 264 is in the position shown in Fig. 7, which corresponds to that shown in Fig. 1, the valve member 262 will be out of engagement with the seat 268, while the valve member 258 will be in engagement with the seat 267. Thus the inlet passage 253 will be sealed off from the outlet passage 254 in this position of the valve. However, the outlet passage 254 is open to the chamber 261 in this position of the parts. A passage 271 extends to the atmosphere from the chamber 261. Accordingly the chamber 261 will always be at atmospheric pressure, and when the parts are in the position shown in Fig. 7 the outlet passage will be open to the atmosphere through the passage 266, the passage between the shank portion 259 and the walls of the passage 260 and through the chamber 261 to the outlet passage 271. The bracket 237 may be secured to the valve housing 248 in any desired manner, as by means of suitable fastening elements extending through the openings 272.

The inlet passage 253 is connected with a pipe or conduit 273, which leads from a source of air under pressure, and the outlet passage is connected with a pipe or conduit 274, which leads to a diaphragm valve 275 or other suitable air pressure operated means for determining the position of a valve, which is located in a conduit 276 for controlling the flow of liquid, such as a washing or rinsing solution, to a washing machine, or for controlling the flow of fluid through any line, the flow of which is to be controlled for carrying out some operation in any desirable method or apparatus. The diaphragm valve is of such a character that when the conduit 274 is connected with the air pressure conduit 273 through the valve member 248 the valve 275 will be opened by means of the air pressure and will be closed by means of a spring or similar suitable means when the pressure in the line 274 is reduced to atmospheric. When the parts are in the position shown in Figs. 1 and 7 the valve 275 is closed. However, when the bell crank lever is moved due to the roller 247 dropping off the high portion of the cam, or cams, with which it engages, the position of the valve assembly in the valve member 248 will change due to the swinging of the bell crank lever about its pivot in a clockwise direction, causing the valve operating lever 249 to move the plunger 263 inwardly and thus compressing the spring 257, unseating the valve 258 and engaging the valve 262 with the seat 268. When this occurs, then the air under pressure line 273 is connected through the passage 265, chamber 255, passage 260 and passage 266 with the conduit 274 and the valve 275 is opened due to application of air pressure to the diaphragm thereof. Said valve will remain in this position as long as air under pressure is supplied to the diaphgram valve 275.

Figure 2:
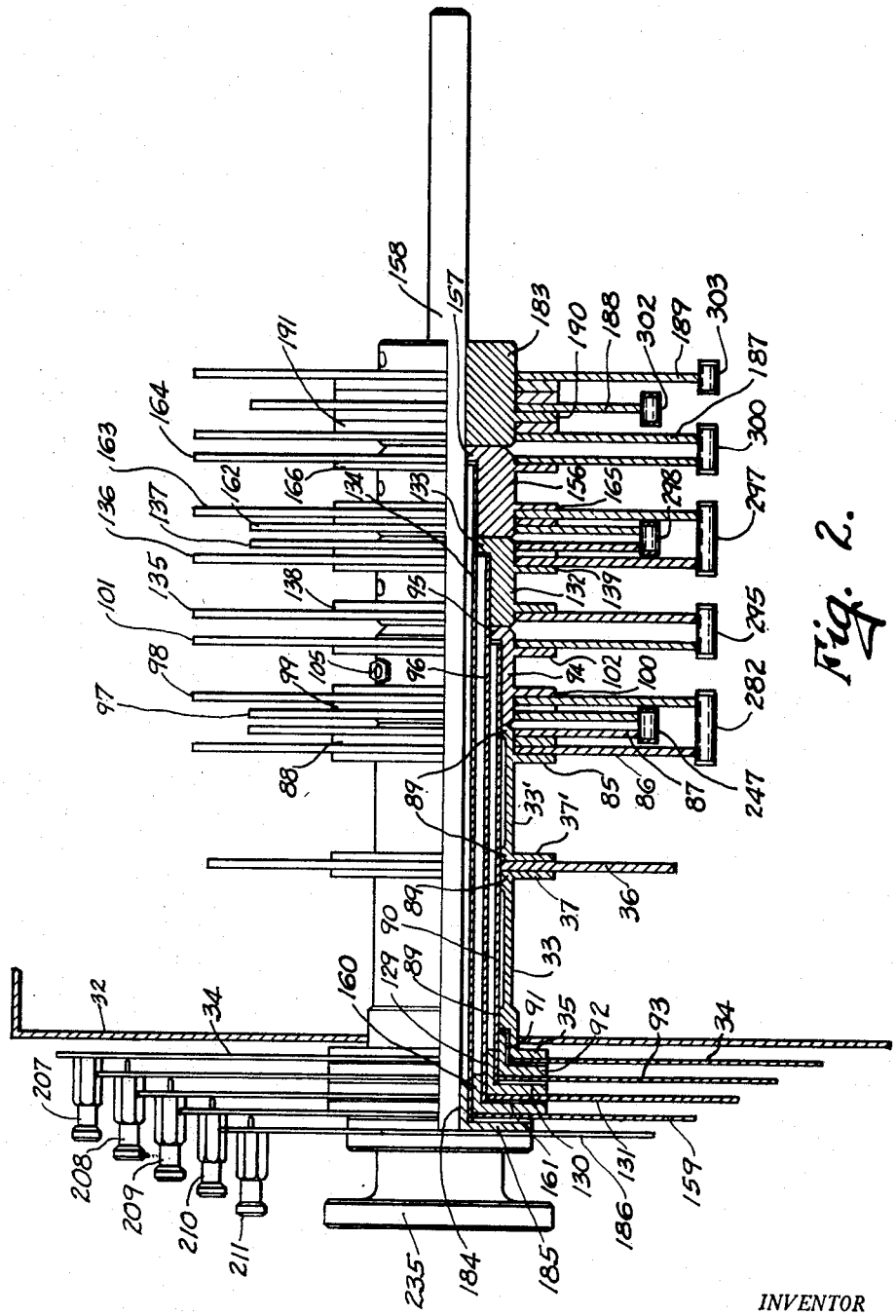
Fig. 2 is a view partly in elevation and partly in longitudinal axial section of the cams, the shafts upon which said cams are mounted and the adjusting means for said cams.

Referring to Fig. 2, the roller 247 is shown diagrammatically therein as engaging the cam 87 and the cam 97. When the parts are in the position shown in Fig.1 the high portion of the cam disk 97 will be opposite the low portion of the cam disk 87, and vice versa. However, due to the fact that the roller 247 is engaging the high portion 106 of the cam disk 97, it will be held in the position shown in Fig. 1, even though the low portion of the cam disk 87 will be opposite the roller 247, the peripheral edge of the cam disk 87 being spaced from the roller 247 when the parts are in the position shown in Fig. 2. Inasmuch as the roller 247 bridges both cams, or is controlled by the two cams acting together, when low portions of both of the cams 87 and 97 are axially aligned with each other the roller 247 will move upwardly into engagement with said low portions and swing the bell crank lever out of the position shown in Fig. 1.

Figure 17:
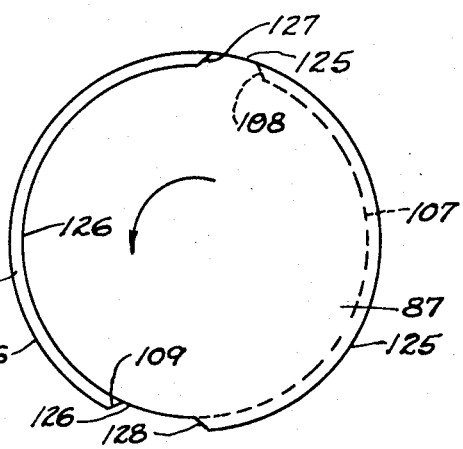
Fig. 17 is a similar view of the pair of smaller in diameter cams in the adjusted position thereof determined by the adjustment of the second largest disk relative to the largest or monitor disk shown in Fig. 6.

Fig. 6 shows an adjusted position of each of the cam controlling disks or dials relative to the one axially adjacent thereto. It will be noted that the adjusting disk or dial 93 has been adjusted in Fig. 6 relative to the monitor dial or disk 34 so that the plunger of the finger piece 208 is in an opening 231 of the disk 34 that corresponds to a setting that will cause the operation controlled by the relative adjustment of the disk 93 to the disk 34 to be carried on for a period of five minutes. Means is provided for indicating the setting of the disk 93 relative to the disk 34. In the form of the invention shown, a scale showing the distance that the disk 93 will travel about its axis of rotation when driven by the ratchet means in a given time interval is provided on the periphery of the disk 93. A reference mark or indicator 277 is provided on the portion of the disk 34 that projects beyond the periphery of the disk 93 adjacent the periphery of the disk 93, the cooperating indicia on the disks 93 and 34 indicating in Fig. 6 that the adjustment is for an operating period or cycle of five minutes for the operation controlled by the cooperating means associated with the disks 34 and 93. The relative position of the cam disks 87 and 97 for this adjustment is shown in Fig. 17. However, the parts have been moved, as will be explained below, from the setting position indicated in Fig. 6 to the starting position for the timer. In this position, it will be noted that the high portion 125 of the cam disk 87 overlaps the high portion of the cam disk 97 so that the cam disks 87 and 97 have the roller 247, which cooperates with said cam disks riding on the cam surfaces 106 and 125 continuously from the inclined portion 109 of the cam 97 to the inclined portion 128 of the cam disk 87 as said cams are rotated in the direction indicated by the arrow on Fig. 17.

It will also be noted that the low portion 107 of the cam disk 97 will lie axially opposite the high portion 125 of the cam disk 87 and the low portion 126 of the cam disk 87 will lie axially opposite the high portion 106 of the cam disk 97 except between the inclined portions 109 of the cam disk 97 and 128 of the cam 87, between which inclined portions the low cam portions 126 and 97 will be opposite each other. Accordingly the roller 247 bridging both cams will be held in the position shown in Fig. 1 except from the time when it reaches the bottom of the inclined portion 128 until it engages the inclined portion 109, whereupon it will again be moved to the position shown in Fig. 1. Accordingly, with the cam disks 87 and 97 having the relative adjustment shown in Fig. 17, the valve 275 will be opened only for five minutes, or during the period that the roller is in engagement with the low portions of both the cam disks 87 and 97. If the valve is used for supplying washing fluid to a washing machine said valve will be opened for the supply of such fluid for the period set. Ordinarily, in the case of a washing or dry cleaning operation, the timer will not be set for merely five minutes for carrying out this operation, but will be set to operate for longer periods, an average setting being about twenty or twenty-five minutes.

In the adjustment shown for the parts in Fig. 6 the plunger associated with the finger piece 208 is in the first opening of the series beyond the zero setting. The openings 231 are set arcuate distances apart so that the adjustment in each succeeding hole 231 in a counter-clockwise direction of the plunger associated with the finger piece 208 will increase the length of the cycle or period of operation by five minutes. The adjustment of the disk 93 relative to the disk 34 also controls the operation of switching means for operating a motor in the structure illustrated in the drawings, the control of the motor being by means of the cam disks 86 and 98.

One of the switch operating cams is illustrated in Fig. 1 of the drawings and comprises a bell crank lever 278 having the arms 279 and 280, said bell crank lever being mounted to swing about a shaft 281 and having a roller 282 thereon that bridges the cams 86 and 98 as shown diagrammatically in Fig. 2. A pin 283 is provided on the end of the arm 280 and said pin projects on both sides of the arm 280 of the lever, the portion of the pin 283 projecting away from the observer in Fig. 1 engaging a roller 284 on a switch operating arm 285 of the switch 286. The pin 283 has a nut 287 threaded thereon for securing one end of the coil tension spring 288 thereto, the other end 289 of said spring being hooked into an opening in the bottom wall 31 of the housing. A suitable slot is provided in the bottom wall 31 for the roller 284 and switch arm 285.

When the parts are in the position shown in Fig. 1, the switch 286 is in open position. However, when the bell crank lever swings about the shaft 281 in a counter-clockwise direction, which is the case when the roller 282 is in engagement with two oppositely located low portions of the cams 98 and 86, the pin 283 engaging the roller 284, will swing the switch arm 285 clockwise into a position in which the switch 286 is closed and the circuit through the conductors 290 and 291, in which said switch 286 is interposed, will be completed. In utilizing the timing device for controlling washing operations, the conductors 290 and 291 extend to a starting switch for a motor that drives the washing machine at the relatively slow speed at which the washing operation is carried on.

Referring to Fig. 16, which shows the position of the cams 86 and 98 diagrammatically, corresponding to the position of the cams 87 and 97 in Fig. 17, the high portion 121 of the cam 86 and the high portion 110 of the cam 98 overlap each other so that the roller 282 will continuously ride on the high portions of said cams from the inclined portions 113 of the cam 98 to the inclined portion 124 of the cam 86. The low portion 122 of the cam 86 extends from the inclined portion 123 to the inclined portion 124 of said cam, but the low portion of the cam 98 extends from the inclined portion 112 to the inclined portion 113, thus placing a portion of each of the low portions of the two cams opposite each other between the inclined portion 124 and 113, and as a result, the roller 282 will, in the rotation of the cams in the direction indicated by the arrow on Fig. 16, travel down the inclined face 124 of the cam 86 and onto the low portions of the two cams and along said low portions until it travels up the inclined portion 113 of the cam 98, during which time the washing machine motor driving the washing machine at a relatively slow speed will be in operation. Since the cams 86 and 87 and the cams 97 and 98 are in fixed relation to each other, the starting and stopping times for the motor controlled by the cams 86 and 98 will be definitely related to the opening and closing of the valves controlled by the cams 87 and 97. The starting and stopping times for the motor may be simultaneously with that of the opening and closing of the valve or in any desired fixed relation thereto. Similarly, any other devices that are to be controlled in their operation relative to each other can be either operated to begin their part of the operation at the same time or in any other timed relation desired to each other by the pairs of relatively movable cam disks and followers controlling operation controlling means, such as the valve and the switch above referred to, in carrying out any other timed operations that it may be desired to carry out in carrying out any process or the operation of any apparatus performing an operation or a plurality of simultaneously or relatively timed operations.

The cam disk 101 is mounted on the hub or sleeve 94 in fixed position so that it rotates with and has a fixed relationship to the cam disks 97 and 98. The cam disk 135 cooperates with the cam disk 101 to determine the cycle or period of operation of an apparatus such as the motor driving a washing machine at a high rate of speed for extracting purposes. Said motor is controlled through a switch similar to the switch 286, which has the position of the switch arm thereof determined by means of a bell crank lever 292, which has an arm 293 that has one end of a coil spring 294 connected therewith, the other end of the coil spring 294 being anchored to the pin 238. The roller 295 is mounted on said bell crank lever and is held in engagement with the cam surfaces of the cam disks 101 and 135 by means of the spring 294.

The cam disk 135 is rotated by means of the adjusting disk or dial 131, which has the finger piece 210 mounted thereon, which is the same in construction as the finger pieces 208 and 209, the plunger on said finger piece being adapted to enter a selected one of the openings 232 in the disk 93. In Fig. 6 the adjustment is shown as being such that the period of operation of the apparatus controlled by means of the cams 101 and 135 is five minutes, the adjustment being determined by means of the reference mark or index 296 on the disk 93 in cooperation with the scale shown on the marginal edge portion of the disk 131. The row of openings 232 extends only part way around the disk 93, being shown as consisting of ten openings in the drawings, but obviously the row of openings could be extended should this be found desirable for controlling whatever operation is controlled by the cams 101 and 135. The openings 232 are such a distance apart that the disk will rotate the distance from one of said openings 232 to the next opening 232 in one minute, whenever the ratchet driving means provided for the timer is in operation. The row of openings 233 and 234 are also spaced such distances apart and are shown as extending only part way around the disks in which they are provided, and obviously these could be extended should this be desired.

Figure 18:
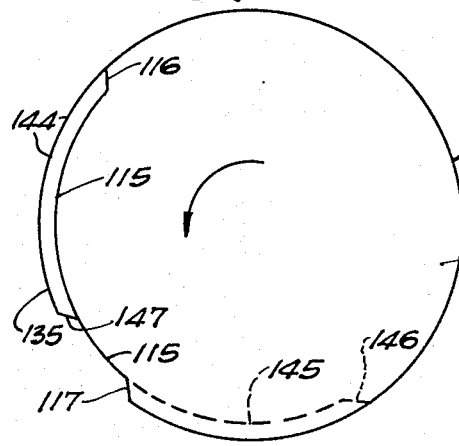
Fig. 18 is a similar view, showing the relative position of the pair of cams in the adjusted position thereof determined by the adjustment of the third largest disk relative to the second largest disk shown in Fig. 6.

The relative position of the cams 101 and 135 for the adjustment thereof shown in Fig. 6, after the adjusting disks have been moved to starting position, is shown in Fig. 18. The high portion 114 of the cam disk 101 and the high portion 144 of the cam disk 135 are overlapped so that the combined distance that the high portions 114 and 144 extend around the axis of rotation of the disk extends from the inclined portion 117 of the cam disk 101 to the inclined portion 147 of the cam disk 135. The low portion 145 of the cam disk 135 and the low portion 115 of the cam disk 101 will be axially opposite the high portion 114 and the high portion 144, respectively, except between the inclined portions 117 and 147. Accordingly the roller 295 will engage the high portion of either one or both of the cams except between the inclined portions 117 and 147 between which two inclined portions the roller will engage with the low portions 115 and 145, and this will cause the bell crank lever 292 to move to such a position that it will close the switch that controls the operation of the motor that drives the washing machine at high speed for extracting purposes. The position of the low portion 115 of the cam disk 101 is such relative to the low portion of the cam disk 98 that, in the adjustment of the disk-like members 101 and 144, the low portions lying between the inclined portions 117 and 147 of the cams will not be engaged by the roller 295 until the roller 282 has moved into engagement with the high portion 110 of the cam disk 98. While the operation of the cam disks 101 and 135 is described herein as controlling the motor for performing an extracting operation in a washing machine, it is obvious that the paired disk cams 101 and 135 and their adjusting disks 93 and 131 could be used in a similar manner for controlling any other operation in connection with any other machine or process.

Mounted on the same hub or collar 132 with the cam disk 135 are the cam disks 136 and 137. The cam disk 136 cooperates with the cam disk 163 to control an operation, in a similar manner to that described in connection with the cam disks 86 and 98, the roller 297 spanning said cam disks 136 and 163. Also the cam disks 137 and 162 cooperate, in a similar manner to the cam disks 87 and 97, to control an operation in a similar manner to that previously described in connection therewith, the roller 298 spanning the pair of disks 137 and 162 so as to cooperate therewith. The adjustment of the cam disks 162 and 163 relative to the cam disks 137 and 136 is obtained by rotating the shaft 134 relative to the shaft 96, which is accomplished by rotating the disk 159 clockwise relative to the disk 131 by means of the finger piece 210, adjustment of said disk 159 relative to the disk 131 being shown in Fig. 6 with the plunger provided on the finger piece 210 in one of the openings 233 provided in the disk 131, the position of the disk 159 and its associated parts relative to the disk 131 being indicated on the scale on the marginal portion of the disk 159 by the index or reference mark 299 on the disk 131.

Figure 19:
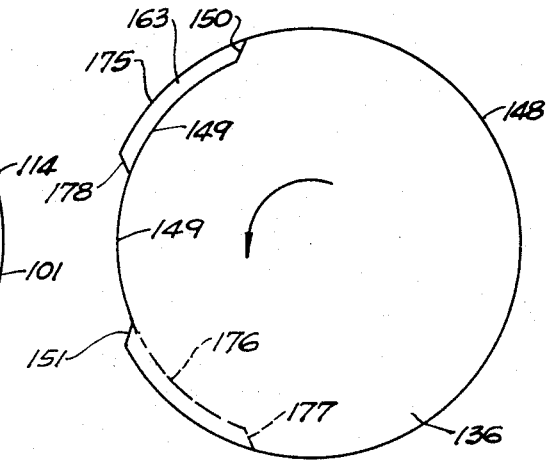
Fig. 19 is a similar view, showing the relative position of the larger in diameter cams in the adjusted position thereof determined by the adjustment of the next to the smallest disk relative to the third largest disk shown in Fig. 6.

The relative position of the cam disks 136 and 163, for the adjustment thereof shown in Fig. 6, after the controlling disks have been moved to starting position for the timer, is shown in Fig. 19. It will be noted that the high portions 148 and 175 of the cam disks 136 and 163 overlap and extend from the inclined portion 151 of the cam disk 136 to the inclined portion 178 of the cam disk 148, and that only the low portions 149 and 176 of the cam disks 136 and 163 that lie between the inclined portions 151 and 178 on said cam disks will be engaged by the roller 297. The roller 297 is provided on a bell crank lever, that is a duplicate of the bell crank lever 278, and which has a pin thereon, that engages the roller 284 of the switch 286, in the same manner as previously described, to cause the washing machine motor that operates said machine at washing or slow speed to be set in operation and to operate during the time that the roller is in engagement with the low portions of the cams 136 and 163.

Figure 20:
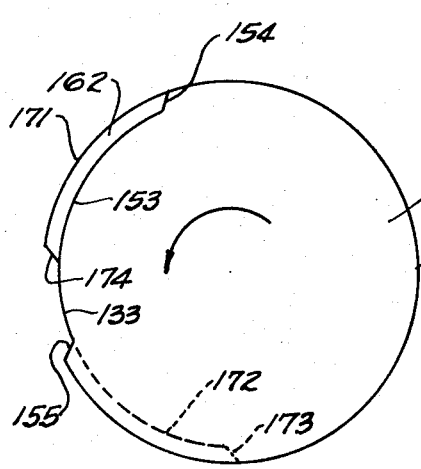
Fig. 20 is a similar view, showing the relative position of the smaller in diameter cams in the adjusted position thereof determined by the adjustment of the next to the smallest disk relative to the third largest disk shown in Fig. 6.

The relative position of the cams 137 and 162 for the adjustment of the controlling disk connected therewith, shown in Fig. 6, after the controlling disks have been moved to starting position, is shown in Fig. 20. It will be noted that the high portions 152 and 171 of said cams overlap, so that the same extend from the inclined portion 155 of the cam 137 to the inclined portion 174 of the cam 162, and that the low portions 153 and 172 lie opposite high portions of the cams, except between said inclined portions 155 and 174, and accordingly the roller 298 will only engage said low portions between said inclined portions 155 and 174 during the rotation of the cams in the direction indicated thereon by the arrow in Fig. 20. The roller 298, in the apparatus illustrated in the drawings, is provided for operating a valve, which is the same as the valve shown in Fig. 7 of the drawings, and is operated by means of a mechanism corresponding to that shown in Fig. 1 of the drawings carrying the roller 247. In a washing machine timer the air valve controls a diaphragm valve similar to the valve 275 in a fluid line for rinsing fluid to open said line during the period that the roller 298 is in engagement with the low portions of the cams, in a similar manner to that previously described in connection with the valve 275. The cams 137 and 162 and their adjusting means, together with the roller 298 and the follower, the position of which is controlled thereby, can be used for determining the length of any period of operation or cycle of any apparatus or process that may be desired.

The cam disk 164 is mounted on the same hub or collar as the cam disks 162 and 163 and is rotated therewith by means of the finger piece 210 when the disk 159, its shaft and the cams carried thereby are adjusted relative to the cam disk 131 and the cams carried thereby. A roller 300 spans the cam disk 164 and a relatively adjustable cam disk 187 that is mounted to rotate with the shaft 158, which is provided with the adjusting disk 186 that has the finger piece 211 thereon. Adjustment of the cam disks 163 and 187 is obtained by rotating the cam disk 186 clockwise relative to the cam disk 159 by means of the finger piece 211 engaging the plunger thereon in a desired opening 234 in the cam disk 159. An adjustment of said controlling or adjusting disks 159 and 186 is shown in Fig. 6, and the relative adjustment of said disks is indicated by means of the index or reference mark 301 on the disk 159 in cooperation with a scale provided on the peripheral portion of the disk 186. The relative position of the cam disks 164 and 187 for the adjustment thereof shown in Fig. 6, after the assembly of disks has been moved to the starting position, is shown in Fig. 21. The high portions 179 and 195 of said cams 164 and 187 extend from the inclined portion 197 to the inclined portion 182 and are opposite the low portions 180 and 196 of said cams, except between said inclined portions 182 and 197. Accordingly, the only time that the roller 300 will be moved into a position in engagement with the low portions 180 and 196 of the cams 164 and 187 will be while portions of the cams between the inclined portions 182 and 197 are moving through their roller engaging position at the lower portion of the timer. When this occurs, a bell crank lever, like the bell crank lever 292, is moved to operate a switch, similar to the switch 286, to put the motor in operation that operates the washing machine at high speed to perform an extracting operation. Obviously the cams 174 and 187, their adjusting dials, and the switching means controlled thereby can be utilized for the purpose of controlling the length of any other operation in any process or apparatus that may be desired other than a washing machine. The relative position of the cam 164 and the cam 163 is such that when the cams 164 and 187 are adjusted to determine the length of an operation controlled thereby, the operation controlled by said cams 164 and 187 will not begin until the operation controlled by the cams 163 and 136 has been completed.

A roller 302 engages the cam disk 188 and a roller 303 engages the cam disk 189. The cam disk 188, which is provided with a high portion 199 and a low portion 200, has the position shown in Fig. 23, for the adjustment of the controlling disk shown in Fig. 6, when the controlling disk assembly has been moved to starting position. The roller 302, upon engagement with the low portion 200 of the cam 188, operates a bell crank lever similar to the bell crank lever 236 shown in Fig. 1, to open an air valve associated therewith to sound a signal, such as a whistle, to indicate that the operation of the apparatus controlled by the timer has been completed. The cam disk 189 having the high portion 203 and the low portion 204 is shown in the corresponding position, diagrammatically, in Fig. 22. The roller 303 that engages said cam 189 is provided with a suitable bell crank lever for opening a switch, of the character of the switch 286, that is in a holding circuit for the switch 84, shown diagrammatically in Fig. 3, to thus halt the motor 59 and the timer when the roller 303 reaches engagement with said low portion 204 of said cam, this occurring at the same time that the signal is sounded, as will be obvious from Figs. 22 and 23.

In operation, the monitor disk 34 is first rotated counter-clockwise to such a position that the zero mark, or a corresponding index or reference mark 304, is opposite another reference mark 305 on the wall 32, and the monitor disk is maintained in this position during the adjusting operation of the other adjusting disks. The disk 93 is next adjusted by moving the same clockwise relative to the disk 34 until the desired time setting for the operation controlled by the cams 86, 98, 87 and 97 is indicated on the scale on the disk 93 by means of the reference mark 277. Next the disk 131 is adjusted relative to the disk 93, by clockwise movement thereof relative to said disk 93, in a similar manner to adjust the relative position of the cam 135 to the cam 101. Then the adjusting disk 159 is adjusted clockwise relative to the disk 131 to obtain the desired relative adjustment of the cams 136 and 163 and the cams 137 and 162 for determining the period of operation controlled by these cams. Finally the adjusting disk 186 is adjusted clockwise relative to the adjusting disk 159 to obtain relative adjustment of the cams 164 and 187 for determining the period of operation controlled by said disk 186. In adjusting the position of each controlling disk relative to the next larger disk, the adjustment is made by means of the finger piece that has the plunger thereon that enters a hole or opening in the next larger disk to hold the disks in their relatively adjusted position.

After all of the disks have been thus adjusted, the finger piece 207 is used to move the entire assembly of the unit counter-clockwise until the zero point on the disk or dial 34 is brought in alignment with the reference mark 306 having the indicia "start" adjacent the same. This closes the switch 34, and its holding circuit having been closed, because the high portion of the cam 189 is in engagement with the roller 303, the timer will start its operation, by the actuation of the ratchet drive in the manner hereinbefore described. This continuous step by step rotation of the ratchet member will cause the shaft 33 to be rotated therewith and the shaft portion 33', the shafts 90, 96, 134 and 158, will all rotate therewith, since all of them are fixed to each other through the disks 34, 93, 131, 159, 186 and the plungers on the finger pieces 208, 209, 210 and 211, thus rotating all the cam disks in unison. This will cause the paired cam disks 86 and 98 and the paired cam disks 87 and 97 to first carry out the operation controlled thereby for the period in which the low portions of said paired cams are engaged by the rollers 282 and 247. Next the cam disks 101 and 135 reach a position such that the roller 295 will engage with the low portions of the paired cams and will cause the next operation to be performed for the desired period of time. Following that, the paired cam disks 137 and 162, and 136 and 163 will reach a position in which the low portions of these cams will be engaged by the rollers 298 and 297 to carry out the operation controlled thereby for the period for which these cams have been set, and finally the cams 164 and 187 will reach a position where the roller 300 will engage the low portions thereof to carry out the final operation, which is controlled by these cams. Following this, the signal is sounded by the reaching of the low portion of the cam 188 in its rotation of a position, where the roller 302 will engage therewith, and at substantially the same time the cam disk 189 will reach the position that the roller 303 engages the low portion of said cam 189 and the holding relay circuit switch will be opened to open the switch 34 and halt the timer.

If it is desired to reset the timer, for the same succession of cycles of the same length, all that is necessary is to rotate the entire assembly counter-clockwise, by means of the knob 235, back to the starting point by turning the assembly until the monitor disk reaches the position that the reference mark or index 304 thereon is in the position shown in Fig. 1, whereupon the timer motor will again be started and the operation will be repeated. If this is not desired, any other desired setting of the various cycles can be obtained by the adjustment of the disk-like adjusting members relative to each other as above described. While the cycles performed by the particular timer described, have been described as comprising a washing, an extracting, a rinsing and an extracting cycle, other operations can be carried out for periods or cycles as may be desired, in any desired apparatus that can be controlled by means of switches or air valves, with my improved timer. If any desired operation controlled by the timing apparatus is to be omitted, the adjusting disk controlling said operation is merely set at the zero point of the dial indicating the adjustment of said adjusting disk relative to the next larger adjusting disk.

What I claim is:

1. A timing device comprising a plurality of parallel, adjacent plate-like members mounted for coaxial rotation, a plurality of said plate-like members being mounted between others of said plate-like members, means for adjusting each of said plate-like members relatively to an adjacent plate-like member about said axis while maintaining the position of all the other plate-like members relative to their adjacent plate-like members, a cam connected with each of said plate-like members to rotate therewith about said axis, followers engaging said cams and each having a position determined by a pair of relatively rotatable cams, and an operation controlling member associated with each of said followers and responsive to the position of said follower, said adjusting means comprising means securing said plate-like members to each other whereby all said cams and plate-like members rotate in unison.

2. A timing device comprising a plurality of parallel, adjacent plate-like members mounted for independent co-axial rotation, said plate-like members comprising a first plate-like member and a plurality of other plate-like members, means for adjusting said plate-like members relatively to each other about said axis and means on each of said other plate-like members engaging an adjacent plate-like member to lock said plate-like member having said means thereon in adjusted position relative to an adjacent plate-like member, a cam connected with each of said plate-like members to rotate therewith about said axis, followers engaging said cams and each having a position determined by a pair of relatively rotatable cams, an operation controlling member associated with each of said followers and responsive to the position of said follower, and means for rotating said cams and plate-like members in unison.

3. A timing device comprising a plurality of parallel adjacent plate-like members mounted for independent co-axial rotation in either direction, means for adjusting each of said plate-like members relatively to an adjacent plate-like member about said axis independently of the adjustment of all other adjacent plate-like members to each other and means for positively locking each of said plate-like members in adjusted position relative to an adjacent plate-like member, a cam connected with each of said plate-like members to rotate therewith about said axis, followers engaging said cams and each having a position determined by a pair of relatively rotatable cams, an operation controlling member associated with each of said followers and responsive to the position of said follower and means for rotating said cams and plate-like members in unison.

4. A timing device comprising a plurality of telescopically related co-axial shafts of graduated length mounted with both ends of each shaft that is telescoped within another projecting therebeyond, a set of axially adjacent cams mounted on each of said shafts at corresponding projecting ends thereof to rotate therewith, followers each engaging a pair of said cams, each pair comprising cams of two different sets, said shafts being relatively rotatable about said axis to adjust the cams of said pairs relatively to each other, a disk mounted on the opposite projecting end of each of said shafts in fixed position, said disks extending in parallelism and the disks of telescopically adjacent shafts being axially adjacent, means on each of said disks for rotating the same, means on each disk for locking the same against rotation relative to an adjacent disk, and means for rotating all said disks, shafts and cams as a unit.

5. A timing device comprising a plurality of telescopically related co-axial shafts of graduated length mounted with both ends of each shaft that is telescoped within another projecting therebeyond, a set of axially adjacent cams mounted on each of said shafts at corresponding projecting ends thereof to rotate therewith, followers each engaging a pair of said cams, each pair comprising cams of two different sets, said shafts being relatively rotatable about said axis to adjust the cams of said pairs relatively to each other, a disk mounted on the opposite end of each of said shafts in fixed position, said disks extending in parallelism and of graduated diameter, the smallest disk being mounted on the longest shaft, the disks of telescopically adjacent shafts being axially adjacent, means on each of said disks for rotating the same, means on each disk for locking the same against rotation relative to an adjacent larger disk, and means for rotating all said disks, shafts and cams as a unit.

6. A timing device comprising a plurality of telescopically related co-axial shafts of graduated length mounted with both ends of each shaft that is telescoped within another projecting therebeyond, a set of axially adjacent cams mounted on each of said shafts at corresponding projecting ends thereof to rotate therewith, followers each engaging a pair of said cams, each pair comprising cams of two different sets, said shafts being relatively rotatable about said axis to adjust the cams of said pairs relatively to each other, a disk mounted on the opposite projecting end of each of said shaft in fixed position, said disk extending in parallelism and the disks of telescopically adjacent shafts being axially adjacent, means on each of said disks for rotating the same, means on each disk for locking the same against rotation relative to an adjacent disk, manual means to rotate all said disks, shafts and cams as a unit and step by step driving means operated at uniformly spaced time intervals for rotating one of said shafts to rotate all of said disks, shafts and cams as a unit.

7. A timing device comprising a plurality of telescopically related co-axial shafts of graduated length mounted with both ends of each shaft that is telescoped within another projecting therebeyond, a set of axially adjacent cams mounted on each of said shafts at corresponding projecting ends thereof to rotate therewith, followers each engaging a pair of said cams, each pair comprising cams of two different sets, said shafts being relatively rotatable about said axis to adjust the cams of said pairs relative to each other, a disk mounted on the opposite projecting end of each of said shafts in fixed position, said disks extending in parallelism and of graduated diameter, the smallest disk being mounted on the longest shaft, the disks of telescopically adjacent shafts being axially adjacent, means on each of said disks for rotating the same, means on each disk for locking the same against rotation relative to an adjacent larger disk, and manual means on the smallest disk for rotating all said disks, shafts and cams as a unit.

8. A timing device comprising a plurality of telescopically related co-axial shafts of graduated length mounted with both ends of each shaft that is telescoped within another projecting therebeyond, a set of axially adjacent cams mounted on each of said shafts at corresponding projecting ends thereof to rotate therewith, followers each engaging a pair of said cams, each pair comprising cams of two different sets, said shafts being relatively rotatable about said axis to adjust the cams of said pairs relatively to each other, a disk mounted on the opposite projecting end of each of said shafts in fixed position, said disks extending in parallelism and the disks of telescopically adjacent shafts being axially adjacent, means on each of said disks for rotating the same, means on each disk for locking the same against rotation relative to an adjacent disk, step by step means comprising a pawl and ratchet mechanism and time controlled means for operating said pawl and ratchet mechanism for driving the outermost of said shafts to rotate all said disks, shafts and cams as a unit in a predetermined direction.

9. A timing device comprising a plurality of telescopically related co-axial shafts of graduated length mounted with both ends of each shaft that is telescoped within another projecting therebeyond a set of axially adjacent cams mounted on each of said shafts at corresponding projecting ends thereof to rotate therewith, followers each engaging a pair of said cams, each pair comprising cams of two different sets, said shafts being relatively rotatable about said axis to adjust the cams of said pairs relatively to each other, a disk mounted on the opposite projecting end of each of said shafts in fixed position, said disks extending in parallelism and of graduated diameter, the smallest disk being mounted on the longest shaft, the disks of telescopically adjacent shafts being axially adjacent, a finger piece on each of said disks for rotating the same, each of a plurality of said disks having an arcuate series of uniformly spaced openings therein, spring projected means on each of said disks smaller than an adjacent disk adapted to engage a selected opening in the larger disk adjacent thereto for locking said smaller disk against rotation relative to said larger disk, and means for rotating one of said disks to rotate all said disks, shafts and cams as a unit.

10. In a timing device, a pair of telescopically related shafts the inner of said pair having an end portion protruding beyond the corresponding end of the other of said pair, each of said shafts having a pair of cam disks mounted in fixed position thereon adjacent the corresponding ends thereof, each of said cam disks having a high portion and a low portion, means for rotating said shafts in unison, one cam disk of each pair being of larger diameter than the other cam disk of said pair, operation controlling means controlled by said cams comprising a follower engaging both of said larger cams and having a position determined by the relative position of the high portion and low portion of one of said larger cams to the high portion and low portion of the other of said larger cams and a follower engaging both of said smaller cams and having a positioned determined by the relative position of the high portion and low portion of one of said smaller cams to the high portion and low portion of the other of said smaller cams, means for relatively adjusting said shafts to vary the relative position of the high and low portions of one pair of said cams relative to the high and low portions of the other pair of said cams, and means for holding said shafts in adjusted position.

11. In a timing device, a pair of telescopically related tubular shafts, the inner of said pair having an end portion protruding beyond the corresponding end of the outer of said pair, each of said shafts having a pair of cam disks mounted in fixed position thereon adjacent the corresponding ends thereof, each of said cam disks having a high portion and a low portion, means for rotating said shafts in unison, one cam disk of each pair being of larger diameter than the other cam disk of said pair, the smaller cam disks of said pairs being between the larger cam disks, operation controlling means controlled by said cams comprising a follower having a roller engaging said pair of larger cams, a follower having a roller engaging said pair of smaller cams each follower having a position determined by the relative position of the high and low portion of one of the cams it engages to the high and low portion of the other cam it engages, means for rotatively relatively adjusting said shafts to vary the relative position of the high and low portions of one pair of said cams relative to the high and low portions of the other pair of said cams, comprising a disk fixed on the opposite end of each shaft having means for rotating the same thereon, one of said last mentioned disks having an arcuate series of uniformly spaced openings therein, spring projected means on the other of said last mentioned disks adapted to engage a selected one of said openings for locking said disks against relative rotation, and means on said last mentioned disks for indicating the relative position thereof.

12. A timing device comprising an axially adjacent series of parallel plate-like members mounted for independent co-axial rotation in either direction, means for adjusting each of said plate-like members relatively to an adjacent plate-like member and simultaneously with respect to a plurality of others of said plate-like members comprising means for releasably locking each of said plate-like members to adjacent plate-like members, a cam connected with each of said plate-like members to rotate therewith about said axis, followers engaging said cams and each having a position determined by a pair of relatively rotatable cams, an operation controlling member associated with each of said followers and responsive to the position of said follower and means for rotating said cams and plate-like members in unison.

13. A timing device comprising a series of axially adjacent parallel disk-like members mounted for rotation about a common axis, a cam connected with each of said disk-like members to rotate therewith, followers engaging said cams and each having a position determined by a pair of relatively rotatable cams, an operation controlling member responsive to the position of each of said followers, power driven and manual means for rotating the disk-like member at one end of said series about said axis, the other disk-like members of said series each being rotatably adjustable relative to the disk-like member adjacent the same on the side thereof toward said end of said series and means detachably connecting each of said disk-like members with said adjacent disk-like member to rotate together in their relatively adjusted position, whereby all said disk-like members and cams are rotatable as a unit upon rotation of said end disk-like member.

14. A timing device comprising a series of axially adjacent parallel disk-like members mounted for rotation about a common axis, a cam connected with each of said disk-like members to rotate therewith, followers engaging said cams and each having a position determined by a pair of relatively rotatable cams, an operation controlling member responsive to the position of each of said followers, power driven and manual means for rotating the disk-like member at one end of said series about said axis, the other disk-like members of said series each being rotatably adjustable relative to the disk-like member adjacent the same on the side thereof toward said end of said series and means detachably connecting each of said disk-like members with said adjacent disk-like member to rotate together in their relatively adjusted position, the disk-like member at the other end of said series being provided with means for manually rotating the same whereby all said disk-like members and cams are rotatable as a unit upon rotation of either of said end disk-like members.

References Cited in the file of this patent

UNITED STATES PATENTS

| | | |
|---|---|---|
| 2,125,513 | Martin | Aug. 2, 1938 |
| 2,249,237 | Fulton | July 15, 1941 |
| 2,540,723 | Geldhof et al. | Feb. 6, 1951 |
| 2,545,617 | Kaefer et al. | Mar. 20, 1951 |
| 2,561,348 | Dunham | July 24, 1951 |
| 2,617,900 | Morrison | Nov. 11, 1952 |
| 2,636,981 | Benow | Apr. 28, 1953 |
| 2,745,918 | Stewart | May 15, 1956 |

FOREIGN PATENTS

| | | |
|---|---|---|
| 287,400 | Switzerland | Apr. 1, 1953 |

UNITED STATES PATENT OFFICE
CERTIFICATE OF CORRECTION

Patent No. 2,939,336                 June 7, 1960

Russell A. Hetzer

It is hereby certified that error appears in the printed specification of the above numbered patent requiring correction and that the said Letters Patent should read as corrected below.

Column 18, line 62, for "shaft" read -- shafts --; line 63, for "disk" read -- disks --.

Signed and sealed this 27th day of December 1960.

(SEAL)
Attest:
KARL H. AXLINE
Attesting Officer

ROBERT C. WATSON
Commissioner of Patents